United States Patent [19]
Shanok et al.

[11] 3,801,417
[45] Apr. 2, 1974

[54] DECORATIVE MOLDING AND METHOD OF FORMING SAME

[75] Inventors: Victor Shanok; Jesse P. Shanok, both of Brooklyn, N.Y.

[73] Assignee: Glass Laboratories Company, Brooklyn, N.Y.

[22] Filed: Dec. 3, 1971

[21] Appl. No.: 204,434

[52] U.S. Cl................... 161/43, 161/112, 161/161, 161/413
[51] Int. Cl............................ B32b 3/26, B32b 5/18
[58] Field of Search........ 161/161, 413, 40, 43, 112

[56] References Cited
UNITED STATES PATENTS
3,262,827  7/1966  Kallander et al. .................. 161/167
3,317,363  5/1967  Weber.......................... 161/161 UX
3,378,612  4/1968  Dietz............................ 161/161 UX

*Primary Examiner*—William J. Van Balen
*Attorney, Agent, or Firm*—Friedman & Goodman

[57] ABSTRACT

Decorative molding and a method of forming the molding, the method comprising extruding a core of selected configuration from foam plastic, encapsulating the extruded foam plastic core with a theremoplastic sheath of greater rigidity than the rigidity of the foam plastic, and fixedly covering at least a portion of the thermoplastic sheath with a decorative thermoplastic strip having a simulated wood-grain colored appearance. The thermoplastic sheath is extruded with a wall of generally uniform thickness in surrounding relation about the extruded foam plastic core so as to conform in shape with the latter.

4 Claims, 5 Drawing Figures

PATENTED APR 2 1974  3,801,417
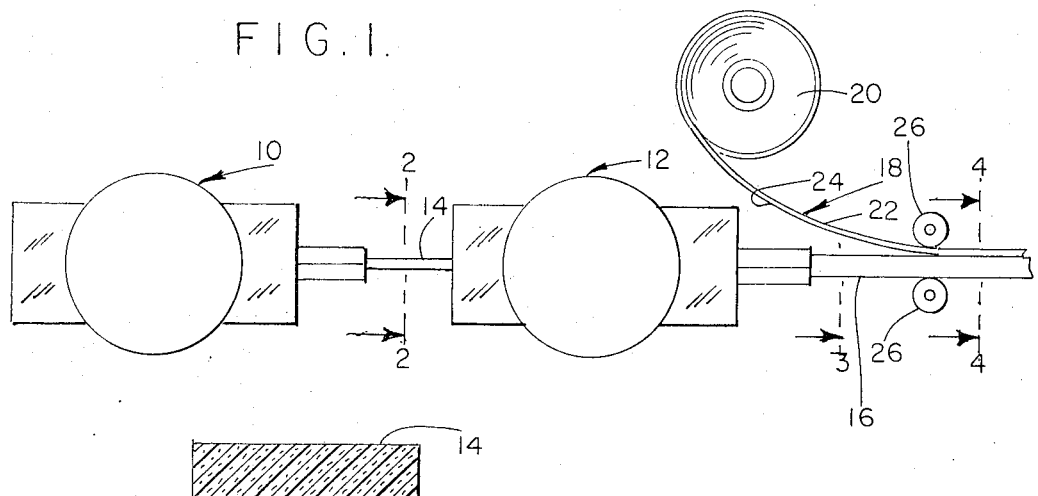
FIG. 1.
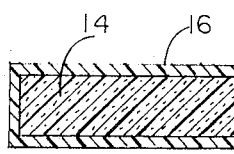
FIG. 2.
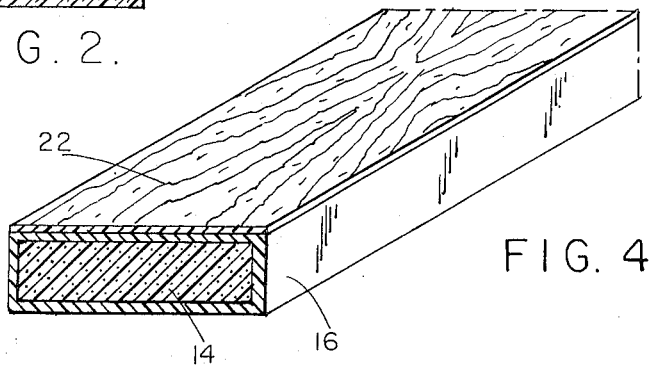
FIG. 3.
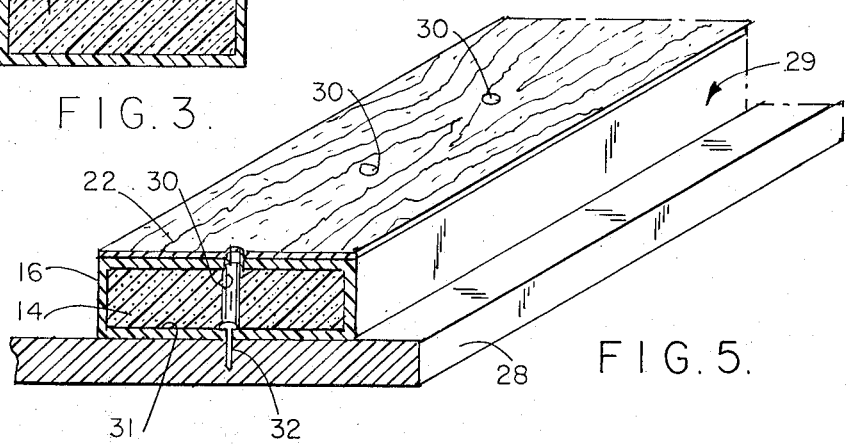
FIG. 4
FIG. 5.

DECORATIVE MOLDING AND METHOD OF FORMING SAME

BACKGROUND OF THE INVENTION

The present invention relates generally to decorative molding and a method of forming same, and more particularly to a provision of decorative molding constituted in part of foam plastic and a thermoplastic sheath surrounding the foam plastic, a portion of the sheath being covered with a substance having a simulated wood-grain colored appearance.

Artisens, such as carpenters or the like, and, for that matter, the home handy-man, are not often resorting to the utilization of plastic substances for achieving various decorative displays, as opposed to the more conventional use of wood. In this respect, wood is rather expensive and often heavy and, therefore, its use is rather limited especially to home-owners who simply wish to decorate a ceiling, so as to convey an appearance of a "beamed" effect, or other exposed surfaces such as door frames and the like.

Thus, the utilization of foam plastics of low density such as polystyrene or the like, is becoming increasingly more desirable and widely accepted to the home decorator. The foam plastics are generally painted in a manner so as to convey a simulated wood-grain colored appearance, and because of the light-weight nature of the foam plastics, they are easily and effectively manipulated and held in position opposite a surface upon which they are to be mounted.

However, the conventional type of foam plastic wood-simulating substitute is often simply manufactured by painting the exposed surfaces thereof so as to simulate a wood-grain appearance. Alternatively, thin sheets of deformable plastic provided with a painted wood-grain simulating appearance are adhesively connected directly to the foam plastics so as to cover the foam plastics and permit use of the latter as a decorative wood substitute.

In either instance, whether the foam plastic is directly painted itself, or covered with a thin film of deformable decorative thermoplastic, because of the nature of the foam plastic, there is an emission of gases therefrom during a period after which the foam plastic was shaped into a specific contour or selected configuration and, thus, when the foam plastic is painted, the emission of gases often causes the formation of air bubbles or the like in the paint and eventually a peeling of the paint from the surface of the foam plastic. The air bubbles will, likewise, result in the peeling of the film of decorative thermoplastic, when the latter is used, from the surface of the foam plastic, as the adhesive provided on the thermoplastic strip or decorative sheet will fail to most effectively secure the latter to the foam plastic due to the emission of gas from the latter.

Moreover, the rigidity of the foam plastic is often less than sufficient for withstanding impact and, therefore, will remain potentially subject to damage upon inadvertant direct impact therewith. Moreover, even when secured to a surface such as by means of nails or screws and the like, there will result substantial deformation of the foam plastic during penetration thereof by the nail or screw, thereby leaving the exposed surface thereof somewhat unsightly and diminishing the capacity thereof as a useful decorative substitute for that of wood.

SUMMARY OF THE INVENTION

Accordingly, it is an object of the present invention to provide a decorative wood substitute.

It is another object of the present invention to provide an inexpensive and rapid method of manufacturing a decorative wood substitute of inexpensive light-weight quality.

It is still another object of the present invention to provide a wood substitute which will not be easily damaged, will withstand pressure of a penetrating nail or screw so as not to deform as it is mounted, and will retain an aesthetic appearance of a wood-grain simulated surface in that any emission of gases will not result in the formation of bubbles or the peeling therefrom of a decorative thermoplastic cover.

It is another object of the present invention to provide a decorative wood substitute in large quantities upon which may be supplied any selective design of wood-grain color and appearance.

To this end, the present invention relates generally to a decorative wood substitute such as for molding or the like and a method of forming same, the method comprising extruding a core of selected configuration from foam plastic, encapsulating the extruded foam plastic core with a thermoplastic sheath of greater rigidity than the rigidity of the foam plastic, and fixedly covering at least a portion of the thermoplastic sheath with a decorative thermoplastic strip having a simulated wood-grain colored appearance. The thermoplastic sheath is extruded with a wall of generally uniform thickness in surrounding relation about the extruded foam plastic core.

BRIEF DESCRIPTION OF THE DRAWINGS

With the above and additional objects and advantages in view as will hereinafter appear, this invention comprises the devices, combinations and arrangements of parts hereinafter described and illustrated in the accompanying drawings of a preferred embodiment in which:

FIG. 1 illustrates a schematic representation of the sequential steps of the method pursuant to the present invention of forming a decorative substitute for wood;

FIG. 2 illustrates a cross-sectional view taken along the line 2—2 in FIG. 1;

FIG. 3 illustrates a cross-sectional view taken along the line 3—3 in FIG. 1;

FIG. 4 illustrates a perspective view, partially in cross-section, taken along the line 4—4 in FIG. 1; and FIG. 5 illustrates a view similar to FIG. 4 wherein the decorative molding pursuant to the present invention is mounted upon an external surface.

DETAILED DESCRIPTION OF THE INVENTION

Referring now to the drawings, and more particularly to FIG. 1, the present invention relates to a method of forming a decorative molding, the method employing a first extrusion station denoted generally by the reference character 10 and a second extrusion station denoted generally by the reference character 12. Issuing or emerging from the first extrusion station 10 is an extruded core formed with a selected configuration and constituted of foam plastic such as a low density polystyrene or the like. The foam plastic core 14 is, thereafter, fed into the second extrusion station 12 wherein it is encapsulated in an extruded thermoplastic sheath 16 constituted preferably of cellulose acetate or cellulose acetate butyrate, the thermoplastic sheath 16 being constituted so as to be substantially more rigid than the foam plastic core 14 upon hardening.

The extrusion of the thermoplastic sheath 16 so as to encapsulate the foam plastic core 14 may be effected by conventional apparatus and, thus, further description of the first and second extrusion stations 10 and 12 respectively is omitted herefrom for the sake of clarity.

A supply of thin film in the nature of a strip or sheet 18 constituted of readily strechable and deformable thermoplastic, such as plasticized polyvinyl chloride or a copolymer thereof, is preferably enwound about a spool 20 so as to be disposed proximate the point at which the thermoplastic sheath 16 emerges in a heated condition from the second extrusion station 12, and is fed onto at least a portion of the thermoplastic sheath 16. The upper surface 22 of the film 18 is provided, in a conventional manner, with a wood-grain colored appearance, whereas the lower surface 24 of the film 18 is provided with a heat responsive adhesive, such as of vinyl or thermoplastic derivation, for being secured to the thermoplastic sheath 16 such as by means of a pair of opposing pressing rollers 26. Thus, as the thermoplastic sheath 16, which encapsulates the foam plastic core 14, emerges from the second extrusion station 12, the thin film 18 of readily deformable thermoplastic having an upper surface 22 which is exposed and provided with a wood-grain colored appearance, is fed toward the thermoplastic sheath 16 such that the heat responsive adhesive provided on the lower surface 24 of the film 18 is pressed against the sheath 16 such as by the opposing pressing rollers 26 so as to provide a plastic composite unit which serves as a ready decorative substitute for wood.

The composite plastic unit may be utilized in a manner generally illustrated in FIG. 5 such that it is secured to a support surface 28 such as a ceiling or door frame. In this respect, the composite plastic unit, denoted generally by the reference character 29 in FIG. 5, may be provided with a plurality of sunken screw or nail channels 30, the channels 30 extending at least partially into and preferably throughout the foam plastic core 14 and terminating at the lower inner surface of the thermoplastic sheath 16 such as at 31. Thereafter, screws or nails 32 may be inserted into the sunken channels 30 and with an appropriate tool or the like, may be secured into the support surface 28 for securing the composite plastic unit 29 to the support surface 28. The upper portion of the sunken screw or nail channels 30 may, thereafter, be filled in with an appropriate substance such as plastic wood, or the like, so as to conceal the screws or nails 32 and the depth of the sunken channels 30.

As illustrated in FIGS. 2, 3 and 4, the foam plastic core 14 may be provided with a rectangular cross-section, and encapsulated in a rectangularly cross-sectioned thermoplastic sheath 16. However, other suitable shapes may be readily extruded from the extrusion stations 10 and 12 respectively so as to permit encapsulation of the foam plastic core 14 in the thermoplastic sheath 16, the selected configuration of the foam plastic core 14 and thermoplastic sheath 16 depending on the particular use and location of the resultant composite plastic unit 29 on a support surface 28.

It is clear, that the rigidity of the thermoplastic sheath 16 is such so as to withstand pressure and impact and thereby will readily protect the foam plastic core 14. Moreover, any emission of gases from the foam plastic core 14 will be retained by the thermoplastic sheath 16 and will prevent peeling of the thin film 18 of thermoplastic having the simulated wood-grain appearance. Obviously, the entire composite unit 29 is of extremely light-weight, due to the low density of the foam plastic core 14 and the rather thin wall of generally uniform thickness of the thermoplastic sheath 16 encapsulating the foam plastic core 14, thereby permitting ready manipulation of the composite unit 29 easily and effectively.

Numerous alterations of the structure herein disclosed will suggest themselves to those skilled in the art. However, it is to be understood that the present disclosure relates to a preferred embodiment of the invention which is for purposes of illustration only and is not to be construed as a limitation of the invention.

What is claimed is:

1. Decorative molding comprising a foam plastic core having a selected configuration, said foam core being a polystyrene foam, a thermoplastic sheath encapsulating said core, said sheath including a wall of generally uniform thickness surrounding said core and conforming in shape with said selected configuration of said core, said sheath having a greater rigidity than rigidity of said core with said sheath wall being sufficiently rigid for resisting substantial deformation upon external impact thereagainst to protect said core, said sheath being constituted of cellulose acetate, means for providing said molding with a wood-grain appearance, said means comprising a decorative thermoplastic strip overlying at least a portion of said sheath, said strip including an exposed surface having a simulated wood-grain colored appearance, and adhesive means interposed between respective confronting surfaces of said strip and said portion of said sheath for joining said strip to said portion of said sheath, said adhesive means being a heat responsive thermoplastic derivation.

2. A decorative molding as claimed in claim 1, wherein said molding is provided with a plurality of channels extending through said strip and through said portion of said sheath and at least partially into said core for receiving means to secure said molding to a support surface.

3. Decorative molding comprising a foam plastic core having a selected configuration, said foam core being a polystyrene foam, a thermoplastic sheath encapsulating said core, said sheath including a wall of generally uniform thickness surrounding said core and conforming in shape with said selected configuration of said core, said sheath having a greater rigidity than rigidity of said core with said sheath wall being sufficiently rigid for resisting substantial deformation upon external impact thereagainst to protect said core, said sheath being constituted of cellulose acetate butyrate, means for providing said molding with a wood-grain appearance, said means comprising a decorative thermoplastic strip overlying at least a portion of said sheath, said strip including an exposed surface having a simulated wood-grain colored appearance, said strip being constituted of readily strechable and deformable plasticized polyvinyl chloride, and adhesive means interposed between respective confronting surfaces of said strip and said portion of said sheath for joining said strip to said portion of said sheath, said adhesive means being a heat responsive vinyl.

4. A decorative molding as claimed in claim 3, wherein said molding is provided with a plurality of channels extending through said strip and through said portion of said sheath and at least partially into said core for receiving means to secure said molding to a support surface.

* * * * *